US012602295B2

(12) United States Patent
Chakraborty

(10) Patent No.: US 12,602,295 B2
(45) Date of Patent: Apr. 14, 2026

(54) ISOLATED SNAPSHOT STORAGE FOR FAST RANSOMWARE RECOVERY

(71) Applicant: NetApp, Inc., San Jose, CA (US)

(72) Inventor: Debabrata Chakraborty, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/920,511

(22) Filed: Oct. 18, 2024

(65) Prior Publication Data

US 2026/0010439 A1     Jan. 8, 2026

Related U.S. Application Data

(60) Provisional application No. 63/667,977, filed on Jul. 5, 2024.

(51) Int. Cl.
G06F 11/14     (2006.01)
G06F 11/1446     (2026.01)

(52) U.S. Cl.
CPC ...... G06F 11/1469 (2013.01); G06F 2201/84 (2013.01)

(58) Field of Classification Search
CPC ............. G06F 11/1469; G06F 2201/84; G06F 16/128; G06F 16/2365
See application file for complete search history.

(56) References Cited

U.S. PATENT DOCUMENTS

| | | | |
|---|---|---|---|
| 6,356,941 B1 | 3/2002 | Cohen | |
| 7,773,465 B2 | 8/2010 | Goodman et al. | |
| 9,594,636 B2 | 3/2017 | Mortensen et al. | |
| 11,580,065 B1 * | 2/2023 | Callewaert | G06F 3/067 |
| 12,197,578 B1 | 1/2025 | Brandwine | |
| 2024/0248985 A1 * | 7/2024 | Vokaliga | G06F 21/56 |

* cited by examiner

*Primary Examiner* — Ajay M Bhatia
*Assistant Examiner* — Cindy Nguyen

(57)     ABSTRACT

A data vault system for quickly acquiring snapshots of primary storage of a data storage service and providing snapshots to the service for recovery. The data vault system is hosted on an isolated network with no communicative visibility from the storage service. The system is configured to minimize vulnerability to attackers by storing both data snapshots and data vault system configuration settings on the isolated network. Further, the snapshots are taken of primary storage, allowing for greatly improved performance compared to snapshots taken of backup data. The ports that facilitate communication between the data storage service and the data vault system can only be enabled from within the isolated network side, as the system is not visible from the data storage service. The system enables and disables ports before and after communication to the data storage service, minimizing vulnerability while the vault system both obtains and provides snapshots.

20 Claims, 7 Drawing Sheets

100

300b

TO CONFIGURATION MANAGER

TO VAULT VOLUME

TO STORAGE SERVICE

SWITCH  319

VAULT MANAGER

320b

I/F
321

SCHEDULER
330b

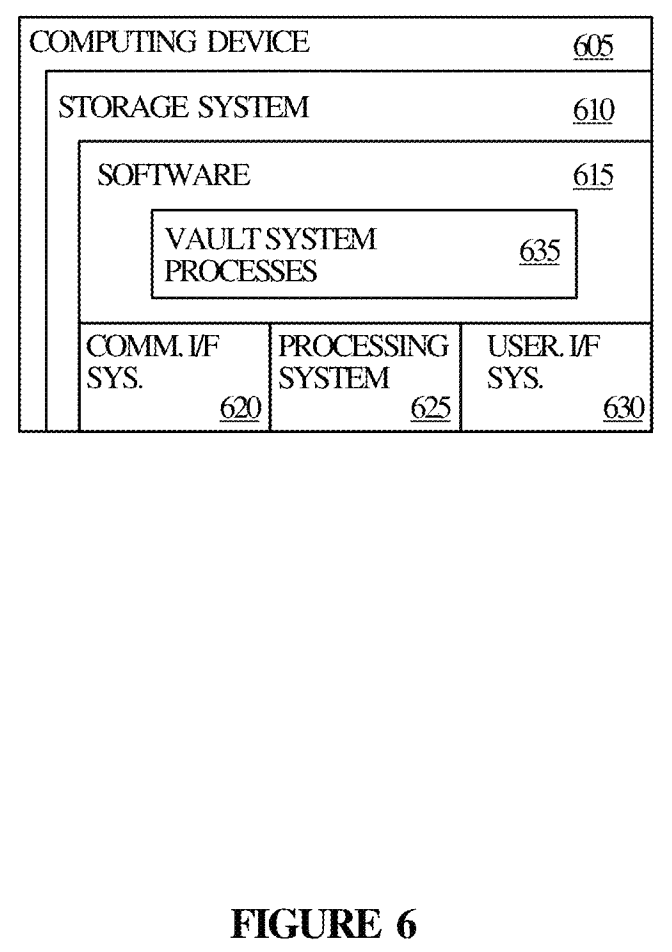

COMPUTING DEVICE 605

STORAGE SYSTEM 610

SOFTWARE 615

VAULT SYSTEM PROCESSES 635

COMM. I/F SYS. 620

PROCESSING SYSTEM 625

USER. I/F SYS. 630

FIGURE 6

ISOLATED SNAPSHOT STORAGE FOR FAST RANSOMWARE RECOVERY

CROSS REFERENCE TO RELATED APPLICATIONS

This application claims priority to U.S. Provisional Patent Application No. 63/667,977, titled "CYBERVAULT FOR RANSOMWARE PROTECTION," filed Jul. 5, 2024, the contents of which is incorporated by reference in its entirety for all purposes.

TECHNICAL FIELD

Aspects of the disclosure are related to the field of computer software applications and, in particular, to ransomware protection and data security.

BACKGROUND

Data storage systems are increasingly threatened by ransomware attacks. To mitigate data loss resulting from ransomware encryption processes, important data is frequently duplicated in snapshots. When an attacker encrypts or deletes user data, the snapshot can be used to restore effected user data without having to comply with the demands of the attacker.

Attackers have recognized this mitigation strategy and modified their attacks to account for it. Attackers hunt down and encrypt or delete the user's snapshots before or during the encryption of user files, eliminating the snapshots as an effective means to defend against ransomware. To revive snapshots as an effective defense, copies of duplicated data have been made immutable. An immutable file cannot be modified, encrypted, or deleted during the file's predetermined retention period. A snapshot that is stored as an immutable file cannot be manipulated during the file's retention period, effectively immunizing the data storage system against data loss resulting from ransomware while the retention period is ongoing.

Unfortunately, with the increasing frequency and sophistication of phishing attacks and the like, an attacker may be able to acquire administrative credentials for a data storage system. With administrative authority, an attacker may be able to access and modify snapshot configuration settings, and in particular, the configuration setting for snapshot retention. By reducing the retention period for a given snapshot, the attacker causes the immutability of the snapshot to expire. In some cases, a snapshot having expired immutability is automatically deleted by the system, while in other cases, the snapshot with expired immutability is merely vulnerable to deletion. In either case, snapshots are vulnerable to ransomware attacks that appreciate and exploit this weakness. As such, improvements to existing data vault systems and data vaulting processes are needed.

SUMMARY

Disclosed herein are methods and systems for providing a data vault system with enhanced resilience to ransomware attacks. The data vault system provides secure storage for a data storage service that can be used specifically to securely store snapshots of the data storage service. The data vault system protects the snapshots, which are immutable (i.e., cannot be deleted before expiration of the retention period), by securing the snapshot configuration data within the data vault system. The snapshot configuration data is initially entered by a highly specialized administrator and is secured in the data vault system. Because the snapshots are immutable and the configuration data defining retention periods is secured in the vault, the snapshots are protected from manipulation by ransomware attackers that may otherwise have access to the data storage service. In particular, even a ransomware attacker having access to the credentials of an administrator of the data storage service will be unable to erase or encrypt the snapshots stored in the data vault system.

Methods of operating the data vault system as disclosed herein leverage the benefits of securely storing snapshot configuration data in the data vault system and are designed to preserve that benefit. Once the data vault system is configured, communication with the data storage service is established, a request for a snapshot is transmitted, a snapshot is received, and communication with the data storage service is disabled. In particular, the snapshot is of the primary storage of the data storage service as opposed to a snapshot of backup data. Procedures for requesting and receiving snapshots are managed at the data vault system, not the data storage service. In effect, the data storage service is unable to establish a connection to the data vault of its own accord. Instead, the data vault system establishes and disestablishes connections to the data storage service based on the snapshot configuration data. The enabling and disabling of the connection is strategically orchestrated to minimize the period of time during which any ports of the data vault system exist as potential targets for ransomware attack. Maximizing the period that a given port is disabled directly maximizes the period during which the given port cannot be used to successfully infiltrate the data vault system to implement an attack.

The data storage service, while able to utilize the snapshot data stored in the data vault system in the case of ransomware events, does not have the capacity to modify snapshot configuration data, to delete immutable snapshots, or to independently establish a connection to the data vault system at all. As such, ransomware attackers having stolen the credentials of user or administrators of the data storage system are unable access the data vault system to destroy or modify snapshots. The snapshots, therefore, endure as effective means to recover lost or encrypted data in a ransomware scenario despite significant intrusion into the data storage service.

BRIEF DESCRIPTIONS OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIG. 6 illustrates a computing device in an implementation.

DETAILED DESCRIPTION

Figure 1:
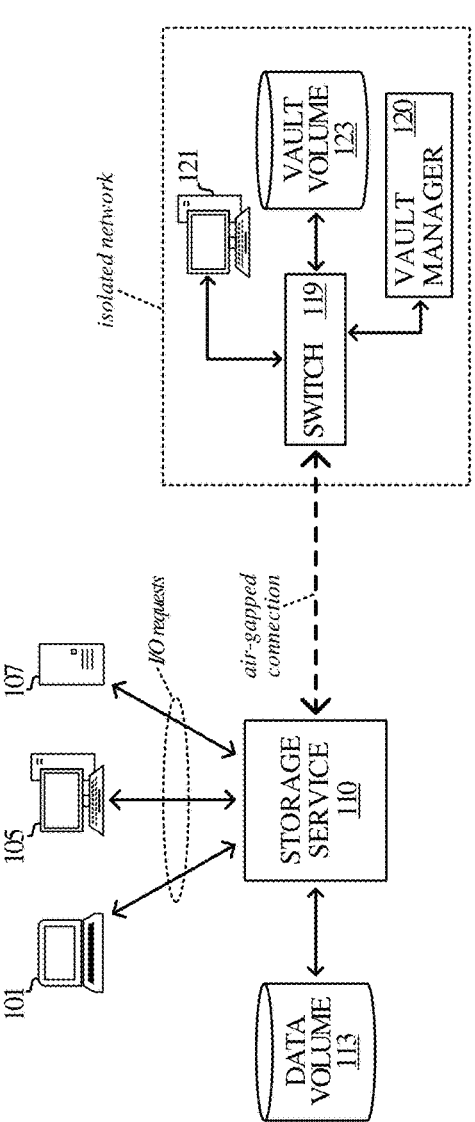
FIG. 1 illustrates an operating environment in accordance with an implementation.

Disclosed herein are methods and systems providing a data vault system. The data vault system receives snapshot configuration data from a configuration manager via a first port. Based on the configuration data, the data vault system determines to obtain a snapshot of a one or more data volumes of the primary storage of a data storage service. In response to determining to obtain the snapshot, the data vault system enables a second port through which to communicate a pull request for the snapshot. To obtain the snapshot, the pull request is transmitted to the data storage service via the second port. In response to receiving the snapshot via the second port, the data vault system disables the second port and stores the received snapshot in a secure data volume.

In some embodiments, the ports being enabled and disabled by the data vault system are within a dedicated vault switch. In such embodiments, a vault manager of the data vault system orchestrates the enabling and disabling of the ports. In some scenarios, certain ports are enabled by default, such as the port used for configuration or to receive recovery requests. By enabling some of the ports of the dedicated vault switch by default, the data vault system can certain permissible communications at any time, such as requests for a snapshot to be used in a recovery process.

In some embodiments, the data vault system is on an isolated network. In particular, the isolated network is isolated from the network or device hosting the data storage service. In some embodiments, prior to receiving the snapshot configuration data, the configuration manager is enabled. In such embodiments, the configuration manager is subsequently disabled once the snapshot configuration data is received. In some embodiments, the configuration manager is implemented as a virtual computing device, which is disabled by default. In some embodiments where a port enabled by default facilitates communication between the configuration manager and the data vault system, the ability to submit configuration information to the data vault system requires the authority to enable the configuration manager. Without enabling the configuration manager, no configuration information can be submitted to the vault manager via the dedicated vault switch, despite the fact that the necessary port underlying the communication is enabled.

In some embodiments, the snapshot configuration data includes a port schedule and a snapshot retention period. The port schedule includes port scheduling information that, when evaluated by the data vault system, results in automatic scheduling and initiation of procedures for snapshot acquisition. The snapshot retention period includes information that defines, for one or more snapshots of the data storage service, a retention period. The retention period defines the length of the period of immutability for a snapshot. The period is set such that when the desired lifespan of a snapshot is complete, the snapshot can be automatically deleted by the data vault system or otherwise manually deleted by an administrator. The configuration data for the port schedule and the retention data are secured in the data vault system as opposed to elsewhere, such as within the data storage service. In some embodiments, determining to obtain the snapshot of the data volume based on the snapshot configuration data includes determining to obtain the snapshot based on the port schedule.

In some embodiments, the data vault system identifies a creation time for the snapshot. In such embodiments, the data vault system compares the creation time for each snapshot with a snapshot retention period to determine a remaining lifespan for the snapshot. In some cases, the snapshot retention period applies to all of the snapshots secured in the data vault system, while in other cases, differing snapshots are retained in accordance with different snapshot retention periods. In some embodiments, the data vault system determines to delete a given snapshot based on the remaining lifespan for determined for the given snapshot. In response, the data vault system deletes the given snapshot.

In some embodiments, the data vault system receives a snapshot recovery request corresponding to a data storage service. The snapshot recovery request is received from a configuration manager of the data vault system. The snapshot recovery request received by the data vault system is a request for a snapshot corresponding to data from the data storage service. The data vault system determines to provide the snapshot in response to receiving the request. The snapshot is retrieved from a storage volume of the data vault system in order to be provided to the data storage service. With the snapshot retrieved, the data vault system enables a port by which the snapshot will be provided to the data storage service. The snapshot is transmitted to the data storage service, and the port is then disabled.

In some embodiments, the data vault system generates a disable instruction in response to receiving the snapshot recovery request. In such embodiments, the disable instruction is transmitted to the configuration manager, which responsively enters a disabled state. In a disabled state, the configuration manager cannot be interacted with, or even discovered.

In some embodiments, another port of the data vault system is enabled, through which the snapshot corresponding to the snapshot recovery request is retrieved from the storage volume of the data vault system. Once the snapshot is retrieved, the port is disabled.

Various embodiments of the present technology provide for a wide range of technical effects, advantages, and/or improvements to computing systems and components. For example, various embodiments may include one or more of the following technical effects, advantages, and/or improvements: 1) non-routine and unconventional implementation of data vault system architecture for securing snapshot configuration data; and 2) non-routine and unconventional operations for acquiring snapshots via snapshot pull requests.

With regard to the first technical effect, the non-routine and unconventional implementation of data vault system architecture allows for the secure storage of snapshot configuration data. Beneficially, securely storing snapshot configuration data eliminates a vulnerability to the data vault system by which ransomware attackers reduce snapshot retention periods. By blocking ransomware attackers from reducing snapshot retention periods, snapshots remain an effective means to recover from ransomware attacks even where attackers have substantially infiltrated the data storage service through user and/or administrative security credentials.

With regard to the second technical effect, the non-routine and unconventional operations for acquiring snapshots via snapshot pull requests preserves the improved security described in the previous technical effect. By obtaining snapshots from the data storage service using a pull scheme, the second port is entirely obscured to the data storage until the data vault system has established the connection by enabling the second port (i.e., the second port of the switch is undiscoverable, making the entire data vault system undiscoverable from the perspective of the data storage system). Beneficially, this means that no user of the data storage service, whether a common user or an administrator, may access the data vault system, meaning that the snapshot configuration data stored therein enjoys a high degree of protection. To modify the snapshot configuration data, new snapshot configuration data is submitted by the configuration manager to the first port.

Further, the techniques disclosed herein allow for more quickly and efficiently acquisition of snapshots. As opposed to obtaining snapshot data from backup data sources, the data vault techniques herein acquire the snapshot directly from the primary storage of the data storage system. This is not only significantly quicker, but also eliminates any need for the data storage service to "push" snapshot requests to the data vault system. In other words, the data vault system can execute snapshot acquisition without the storage service having any role in the procedure outside of receiving requests for snapshots, producing the snapshot, and returning it to the data vault system. Snapshot recovery (delivering an existing snapshot of the data vault system to the data storage service for recovery) can be carried out in a similar manner with the data storage service having a minimum role. Because the dedicated air-gapped connection between the data vault system and the data storage service is open from the time the snapshot request is transmitted to the data storage service to the time the snapshot is received at the data vault system, minimizing the time required to obtain the snapshot beneficially reduces the period the air-gapped connection is enabled. As a result of minimizing this period, the extent to which the air-gapped connection represents a potential target to attackers is similarly minimized.

FIG. 1 illustrates operating environment 100 in accordance with an implementation. Operating environment 100 includes user 101, user 105, user 107, storage service 110, data volume 113, switch 119 vault manager 120, configuration manager 121, and vault volume 123. Operating environment 100 is generally representative of an environment in which a data vault system may operate and interact storage service 110.

Each of user 101, user 105, and user 107 are generally representative of users interacting with storage service 110. Each of user 101, user 105, and user 107 may be a client user, a client administrator, a client application, and the like. User 101, user 105, and user 107 may interact with storage service 110 via a computing device, an example of which is given by computing device 605 of FIG. 6. Each of user 101, user 105, and user 107 submit I/O requests to storage service 110. In many cases, the I/O requests of user 101, user 105, and user 107 correspond to data stored in data volume 113. Note that user 101, user 105, and user 107 are not specialized administrators that are granted the authority to interact with configuration manager 121 or to submit snapshot configuration data.

Storage service 110 is generally representative of a data storage service through which users can store, access, and modify data. Storage service 110 may be implemented via a computing device, an example of which is given by computing device 605 of FIG. 6. Data stored in storage service 110 may be kept in data volume 113. As described herein, storage service 110 is a data storage service, though in other embodiments, storage service 110 may be an application or service for which a snapshot provides benefit in overcoming ransomware attacks. Storage service 110 is configured to receive a snapshot request from vault manager 120, and in response, to produce a snapshot. The snapshot may be of data volume 113 and the data included therein. The snapshot, once produced, is transmitted back to vault manager 120.

Where complications occur in storage service 110, a recovery request may be generated and transmitted to configuration manager 121. In some embodiments, a user or other external actor may interface with configuration manager 121 directly to generate the recovery request. The recovery request may be generated in response to a ransomware attack, data loss from some other cause, or for some other reason. The recovery request is a request for an existing snapshot stored in the data vault system. The snapshot is representative of a point-in-time for storage service 110. Using the existing snapshot, storage service 110 can be returned to the point-in-time with regard to data in data volume 113 and state data for storage service 110.

Storage service 110 is connected to vault manager 120 by one distinct connection, which is an air-gapped connection entirely controlled by vault manager 120. The air-gapped connection between storage service 110 and vault manager 120 is used for snapshot requests and snapshots but is only available for use once vault manager 120 has enabled the associated port. Attempts to utilize the air-gapped connection where vault manager 120 has not enabled the port will always fail. Vault manager 120 enables the port associated with the air-gapped connection based on snapshot configuration data received from configuration manager 121. In some embodiments, the snapshot configuration data includes a port schedule and a snapshot retention period. The port may also have a randomized address to further obscure the port from the view of storage service 110 until such a time when vault manager 120 establishes the connection.

Data volume 113 is generally representative of a structure for storing data. Data volume 113 is associated with storage service 110, and stores data associated with I/O requests of user 101, user 105, and user 107. During a ransomware attack, the data stored in data volume 113 may be deleted or encrypted. To overcome such an attack, snapshots can be used to restore the data in data volume 113, and in some cases state data of storage service 110. Where storage service 110 receives a snapshot request, a snapshot including at least the data of data volume 113 is generated. In some cases, the snapshot includes a creation time that can be used to ascertain the point-in-time the snapshot was created. The creation time can be leveraged to determine a remaining lifespan for a particular snapshot based on the snapshot retention period for the snapshot. Snapshots can be stored in vault volume 123 once transmitted back to vault manager 120.

Switch 119 is generally representative of a network switch that facilitates communication within and between networks by directing data packets to the appropriate devices or other switches. Further, switch 119 enables data exchange between multiple devices of one or more networks. In some embodiments, switch 119 represents an independent element of operating environment 100. In some embodiments, switch 119 is integrated into the hardware, software, or firmware on which vault manager 120 is implemented. Where switch 119 is integrated into the hardware, software, or firmware on which vault manager 120 is implemented, vault manager 120 may include a number of additional elements corresponding to switch 119. Examples of such embodiments are described in the text below.

Vault manager 120 is generally representative of a vault manager for a data vault system. Vault manager 120 may be implemented via a computing device, an example of which is given by computing device 605 of FIG. 6. As described herein, vault manager 120 may constitute an entire data vault system, while in other cases, a data vault system may include vault manager 120 and vault volume 123. In some further embodiments, a data vault system may include vault manager 120, configuration manager 121, and vault volume 123. Where vault manager 120 constitutes the entire data vault system, the entire data vault system may be implemented via a computing device, an example of which is given by computing device 605 of FIG. 6. In any case, vault manager 120 may be located on a network isolated from external elements such as storage service 110, user 101, user 105, and user 107. Vault volume 123 and configuration manager 121 are illustrated as included in the isolated network containing vault manager 120 but may be located in various locations remote to vault manager 120 in other embodiments.

Vault manager 120 is responsible for managing the air-gapped connection between the isolated network that vault manager 120 is contained within and storage service 110. In some cases, vault manager 120 establishing the air-gapped connection includes vault manager 120 directing a host computing device to enable a port of a network interface. In some embodiments, vault manager 120 directs a dedicated vault switch (e.g., switch 119) to enable and disable ports as needed to implement the processes described herein.

Configuration manager 121 is representative of a computing device for securely submitting snapshot configuration data to vault manager 120, an example of which is given by computing device 605 of FIG. 6. A specialized administrator may submit snapshot configuration data to vault manager 120 via configuration manager 121. In some cases, a specialized application or program may submit the snapshot configuration data to vault manager 120 via configuration manager 121. In some embodiments, configuration manager 121 is disabled by default. In such embodiments, where it is desired to submit snapshot configuration data to vault manager 120, configuration manager 121 may be powered on or otherwise enabled. In such embodiments, once snapshot configuration data has been submitted to vault manager 120 via configuration manager 121, configuration manager 121 may be powered off or otherwise disabled. In many embodiments, configuration manager 121 remains powered off or otherwise disabled until such a time when snapshot configuration data is to be submitted to vault manager 120. Configuration manager 121 may be powered on or otherwise enabled manually by a specialized administrator or may be powered on or otherwise enabled by some application, software process, or the like. Notably, at no point can configuration manager 121 be accessed from storage service 110, the host device containing storage service 110, or the network hosting storage service 110, thereby further securing the ability to modify snapshot configuration data. In some examples, configuration manager 121 is a virtual computing device entirely intended for submitting snapshot configuration data to vault manager 120 and no other purpose. In such examples, the dedicated virtual device is powered off while not in use, rendering the submission or modification of snapshot configuration data essentially impossible.

Vault volume 123 is generally representative of a secure structure for storing data. Vault volume 123 may be secured by a number of strategies, such an locating vault volume 123 on the same isolated network as vault manager 120 or by some other means. Vault volume 123 is associated with vault manager 120, and stores at least snapshots associated with storage service 110. Where a ransomware attack deletes or encrypts the data of data volume 113, a snapshot contained in vault volume 123 can be utilized to return storage service 110 to the point-in-time when the snapshot was created. To overcome such an attack, snapshots can be used to restore the data in data volume 113, and in some cases state data of storage service 110. Where storage service 110 receives a snapshot request, a snapshot including at least the data of data volume 113 is generated.

Figure 2:
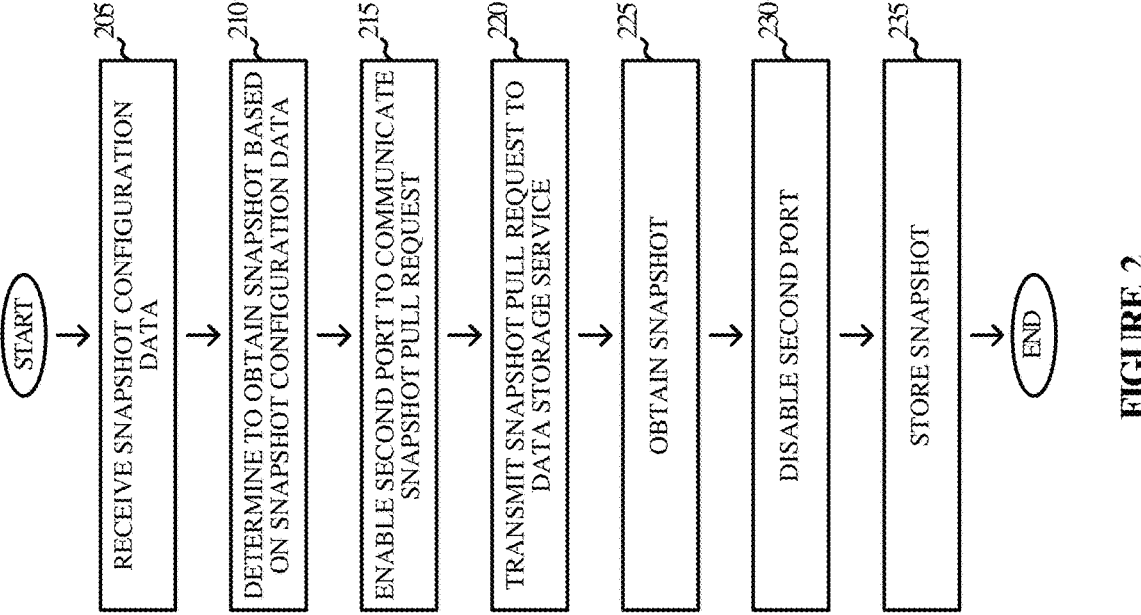
FIG. 2 illustrates an operating method in accordance with an implementation.

FIG. 2 illustrates method 200 in accordance with an implementation. The steps of method 200 are referenced parenthetically in the paragraphs that follow and may be carried out in the context of the systems and elements of operating environment 100 of FIG. 1.

To begin, snapshot configuration data is received at a data vault system (step 205). The snapshot configuration data may be received from a configuration manager (e.g., configuration manager 121) and may be received at a vault manager of the data vault system (e.g., vault manager 120). In some cases, the snapshot configuration data includes a port schedule and a snapshot retention period. In some cases, the configuration manager is first powered on or otherwise enabled prior to the reception of snapshot configuration data at the data vault system. The configuration manager may be used to submit the snapshot configuration data, after which the configuration manager may be powered off or otherwise disabled.

The data vault system determines to obtain a snapshot from a data storage service (e.g., storage service 110) based on the snapshot configuration data (step 210). In some cases, determining to obtain the snapshot based on the snapshot configuration data includes determining to obtain the snapshot based on the port schedule. In response to determining to obtain the snapshot from the data storage service, the data vault system enables a port by which to communicate a snapshot pull request to the data storage service (step 215). The port cannot be enabled from the data storage service, meaning that only the data vault system can establish the air-gapped connection. The corresponding port at the host environment of the data storage service may generally be enabled and have a static address, while the port enabled by the data vault system may be generally disabled and use dynamic or random identifying information to preserve anonymity.

With the port enabled, the data vault system transmits the snapshot pull request to the data storage service (step 220). The snapshot pull request is a request from the data vault system that instructs the data storage service to respond with a snapshot of a volume of the data storage service (e.g., data volume 113). Beneficially, the nature of the pull request requires no involvement from the data storage service other than the reception of the snapshot pull request and the snapshot provided in response. In other words, the relative lack of agency that the data storage service has in the snapshot process equates to a relative lack of tools a ransomware attacker may leverage during an attack. This provides robust protection of snapshots and snapshot configuration data. In response to the snapshot pull request, the data storage service replies with a snapshot, which the data vault system receives via the same port used to transmit the snapshot pull request (step 225). The snapshot may include data relating to an application, such as workload or production data, may include metadata or state data for the data storage service, and may include other information relating to The data vault system disables the port once the snapshot has been received (step 230). The data vault system then stores the snapshot in a secure data volume, such as vault volume 123 of FIG. 1 (step 235). The secure data volume may be located on the isolated network as the data vault system, or may be located at some other location. Beneficially, even where the secure data volume is itself located within the data storage service, because the snapshot is immutable and the snapshot configuration data remains securely stored in the data vault system, the snapshot remains immune to manipulation that would disqualify it as effective means for overcoming ransomware attacks.

Figure 3A:
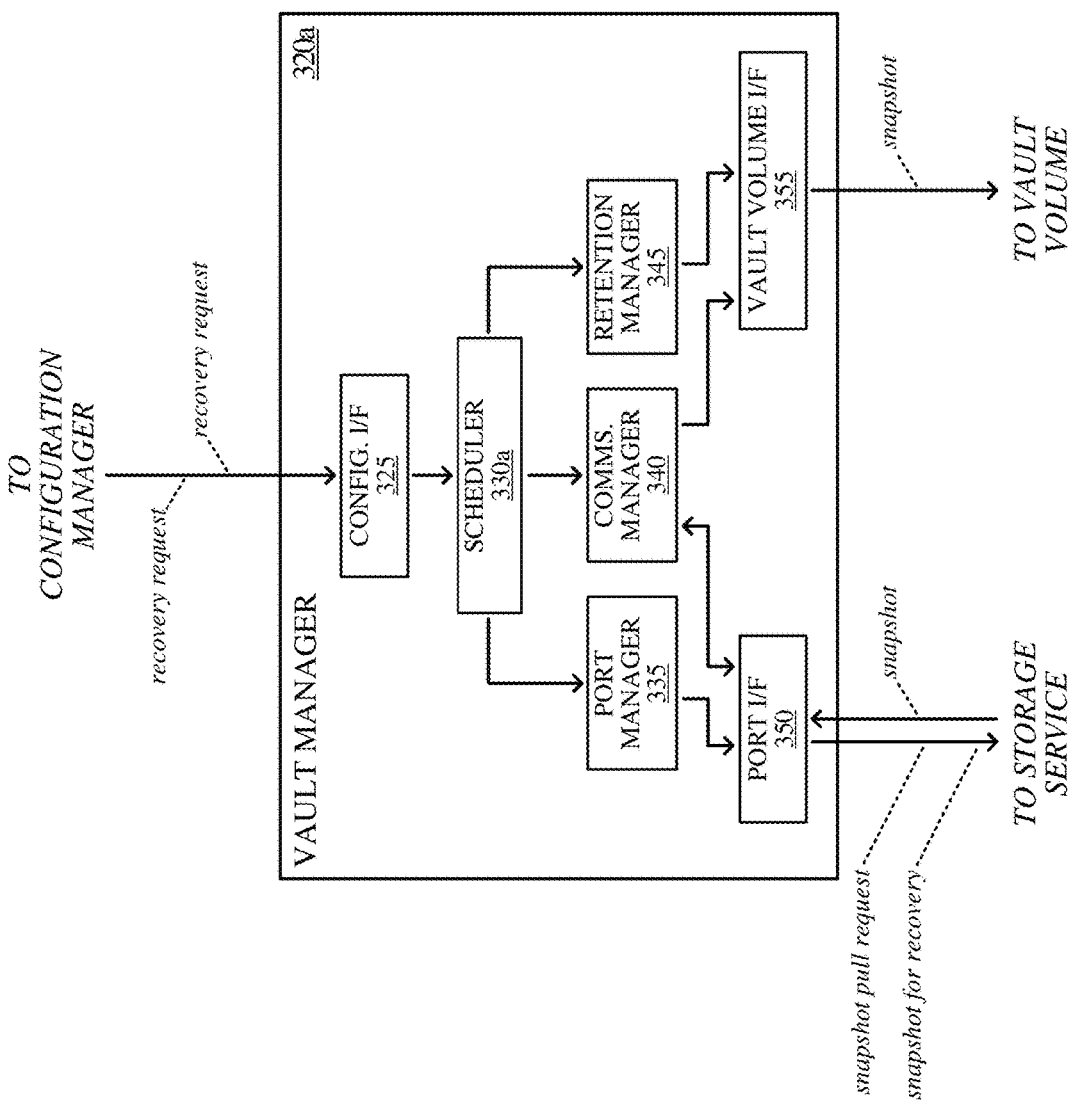
FIG. 3A illustrates a vault manager in accordance with an implementation.

FIG. 3A illustrates vault manager 320a in accordance with an implementation. FIG. 3A illustrates an embodiment in which a dedicated vault switch, such as switch 119 of FIG. 1, is an integrated into vault manager 320a. Vault manager 320a is generally representative of a vault manager for a data vault system, of which vault manager 120 of FIG. 1 is an example. Vault manager 320a may be implemented via a computing device, an example of which is given by computing device 605 of FIG. 6. Vault manager 320a includes configuration interface 325, scheduler 330a, port manager 335, communications manager 340, retention manager 345, port interface 350, and vault volume interface 355.

Each of configuration interface 325, scheduler 330a, port manager 335, communications manager 340, retention manager 345, port interface 350, and vault volume interface 355 may be implemented as software, firmware, or hardware and may be subcomponents of a computing device on which vault manager 320a is implemented. An example of such a computing device is given by computing device 605 of FIG. 6.

Configuration interface 325 is generally representative of an interface for communicating with a configuration manager, such as configuration manager 121 of FIG. 1. Configuration interface 325 may generally be enabled for communication and may use static addresses for ports included therein. Configuration interface 325 may be hardware such as a network interface card, or may be implemented in software or firmware. Configuration interface 325 receives snapshot configuration data from the configuration manager and relays the snapshot configuration data to scheduler 330a.

Scheduler 330a is generally representative of a scheduler for vault manager 320a that receives snapshot configuration data and determines when to initiate a snapshot acquisition process based on the snapshot configuration data. In some embodiments, the snapshot configuration data includes a port schedule and a snapshot retention period. In such embodiments, scheduler 330a bases the determination of when to obtain a snapshot on the port schedule. Policies and logic utilized by scheduler 330a may be implemented in software, firmware, or hardware. Where scheduler 330a determines to obtain a snapshot, a snapshot instruction is generated and transmitted to each of port manager 335, communications manager 340, and retention manager 345 in turn. In some examples, scheduler 330a also receives a snapshot retention period as part of the snapshot configuration data. Scheduler 330a transmits the snapshot retention period to retention manager 345 for further processing.

Port manager 335 is generally representative of a manager for enabling and disabling a port by which a snapshot pull request can be communicated to a data storage service. Port manager 335 receives the snapshot instruction from scheduler 330a, which instructs port manager 335 to enable the port by which the snapshot pull request can be communicated to the data storage service. Port manager 335 then enables the port in question.

Communications manager 340 is generally representative of a manager that orchestrates communications between vault manager 320a and the data storage service. Communications manager 340 receives the snapshot instruction from scheduler 330a and generates a corresponding snapshot pull request. The snapshot pull request instructs the data storage service to produce and respond with a snapshot of the data contained within the data storage service.

Retention manager 345 is generally representative of a manager that governs the retention of snapshots in the data vault system. Snapshots stored in the data vault system (i.e., a snapshot stored in vault volume 123 of FIG. 1) may each be associated with a snapshot retention period that defines how long each of the snapshots are to be retained. Where the snapshot retention period expires, so does the immutability of the snapshot, meaning the snapshot can then be deleted. In some embodiments, scheduler 330a receives a snapshot retention period as part of the snapshot configuration data. In such embodiments, scheduler 330a transmits the snapshot retention period to retention manager 345. Based on the snapshot retention period, and in some cases the creation time of the snapshot, retention manager 345 deletes or removes the snapshot from the data vault system (i.e., deletes or removes the snapshot from vault volume 123 of FIG. 1).

Port interface 350 is generally representative of an interface for communicating with a data storage service, such as data storage service 110 of FIG. 1. Port interface 350 is generally disabled for communication and may use dynamic or random addresses for the ports contained therein. Port interface 350 may be hardware such as a network interface card or may be implemented in software or firmware. In some embodiments, port interface 350 includes a single port. In such embodiments, the single port is only enabled to transmit out snapshot pull requests and to receive back snapshots in response. Where the single port is not enabled, no communication passes through port interface 350.

Vault volume interface 355 is generally representative of an interface for communicating with a secure data volume, such as vault volume 123 of FIG. 1. Vault volume interface 355 transmits snapshots received from the data storage service to the secure data volume for storage.

In an example operations, scheduler 330a receives snapshot configuration data from a configuration manager via configuration interface 325. The snapshot configuration data includes both a port schedule and a snapshot retention period. Scheduler 330a transmits the snapshot retention period to retention manager 345. Scheduler 330a also evaluates the port schedule to determine if a snapshot should be acquired from the data storage service. Based on the port schedule, scheduler 330a determines that a snapshot should be obtained. Based on the determination, scheduler 330a generates a snapshot instruction and transmits the snapshot instruction to both port manager 335 and communications manager 340. Port manager 335, in response to receiving the snapshot instruction, enables a port of port interface 350 by which the snapshot pull request will be transmitted to the data storage service. Communications manager 340, in response to receiving the snapshot instruction, generates a snapshot pull request corresponding to the snapshot instruction. Communications manager 340 transmits the snapshot pull request to port interface 350, which transmits the snapshot pull request to the data storage service via the port enabled by port manager 335. In response to the snapshot pull request, the data storage service produces a snapshot of data stored therein and responds to port interface 350 with the snapshot. The snapshot is received at communications manager 340 via port interface 350, which relays the snapshot to the secure data volume via vault volume interface 355.

Figure 3B:
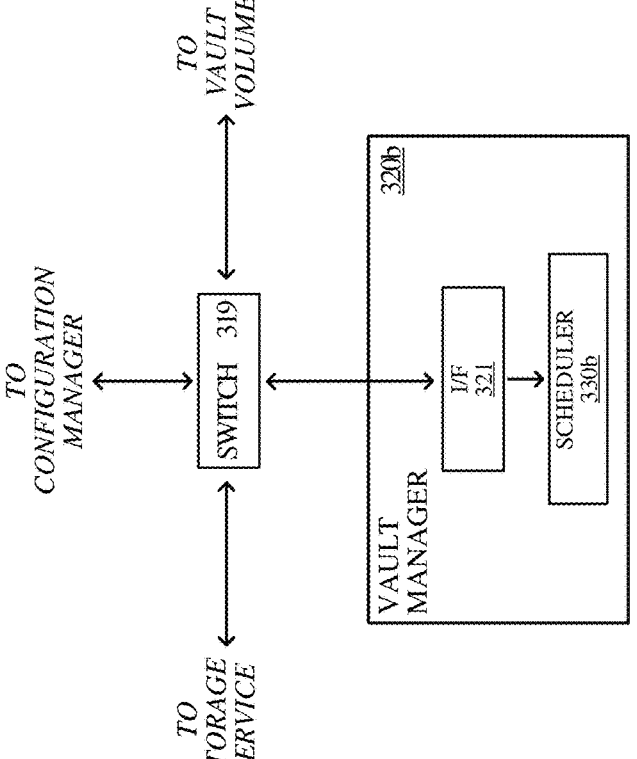
FIG. 3B illustrates a vault manager in accordance with an implementation.

FIG. 3B illustrates vault manager in detail 300b in accordance with an implementation. Vault manager in detail 300b includes switch 319 and vault manager 320b. Vault manager in detail 300b illustrates an embodiment in which a dedicated vault switch, such as switch 119 of FIG. 1, is an independent element from vault manager 320b. Vault manager 320b is generally representative of a vault manager for a data vault system, of which vault manager 120 of FIG. 1 is an example. Vault manager 320b may be implemented via a computing device, an example of which is given by computing device 605 of FIG. 6. Vault manager 320b includes interface 321 and scheduler 330b. Notably, some elements of FIG. 3A are not illustrated here, as the inclusion of switch 319 renders the elements redundant. In particular, in such embodiments, scheduler 330b is configured such to instruct switch 319 to enable and disable various ports in accordance with configuration information received from a configuration manager (e.g., configuration manager 121 of FIG. 1).

Switch 319 is generally representative of a network switch that facilitates communication within and between networks, and devices, by directing data packets to the appropriate devices or other switches. An example of such a network switch is given by switch 119 of FIG. 1. Switch 319 contains ports that can be enabled and disabled in order to facilitate communication with various network and device endpoints. As illustrated here, switch 319 includes ports that at least facilitate dedicated communication with a configuration manager, a storage service, and a vault storage, examples of which are given by configuration manager 121 of FIG. 1, storage service 110 of FIG. 1, and vault volume 123 of FIG. 1, respectively.

In some embodiments, the ports of switch 319 are dynamically enabled and disabled such that communications are only received at the discretion of scheduler 330b, such as configuration information from a dedicated configuration manager (e.g., configuration manager 121 of FIG. 1), or recovery requests from a configuration manager (e.g., configuration manager 121 of FIG. 1). For example, recovery interface 360 may be configured to provide no response to attempts to scan a port therein. Additionally, switch 319 may provide no response to an attempt to configure any element of vault manager 320b that is not received from the configuration manager. Switch 119 may include dedicated ports for particular purposes. In other words, switch 119 may include a port that is configured only to respond to recovery requests and no other communications. Ports contained within switch 319 may be secured by a number of port security techniques, an example of which is port-knocking. Where port-knocking techniques are in use, switch 319 may not provide a response of any kind unless a sequence of predetermined communications is first received.

Interface 321 is generally representative of an interface for communicating with vault manager 320b. In some embodiments, the connection between switch 319 and interface 321 is static and enabled by default.

Scheduler 330b is substantially the same as scheduler 330a and is described in further detail in the text corresponding to FIG. 3A, thought scheduler 330b may include additional elements. In some examples, scheduler 330b also receives a snapshot retention period as part of the snapshot configuration data.

Where scheduler 330b determines to obtain a snapshot based on configuration information, scheduler 330b sends a port enabling instruction to switch 319. In response, switch 319 enables the particular port needed to transmit a snapshot instruction to a storage service, such as storage service 110. Scheduler 330b further generates a snapshot pull request, which is sent to the storage service via the now enabled port of switch 319. The storage service responds with the requested snapshot, after which, scheduler 330 instructs switch 319 to disable the port that was used. Beneficially, by enabling the relevant port only to send the snapshot pull request and disabling the relevant port once the storage service responds with the requested snapshot, the amount of time during which the communication pathway is functional is minimized. As a result, the amount of time the communication pathway represents a potential vulnerability to malicious actors is also minimized.

Here, scheduler 330b further governs the retention of snapshots in the data vault system. Snapshots stored in the data vault system (i.e., a snapshot stored in vault volume 123 of FIG. 1) may each be associated with a snapshot retention period that defines how long each of the snapshots are to be retained. Where the snapshot retention period expires, so does the immutability of the snapshot, meaning the snapshot can then be deleted. In some embodiments, scheduler 330b receives a snapshot retention period as part of the snapshot configuration data. Based on the snapshot retention period, and in some cases the creation time of the snapshot, scheduler 330b deletes or removes the snapshot from the data vault system (i.e., deletes or removes the snapshot from vault volume 123 of FIG. 1).

Figure 3B:
Figure 4:
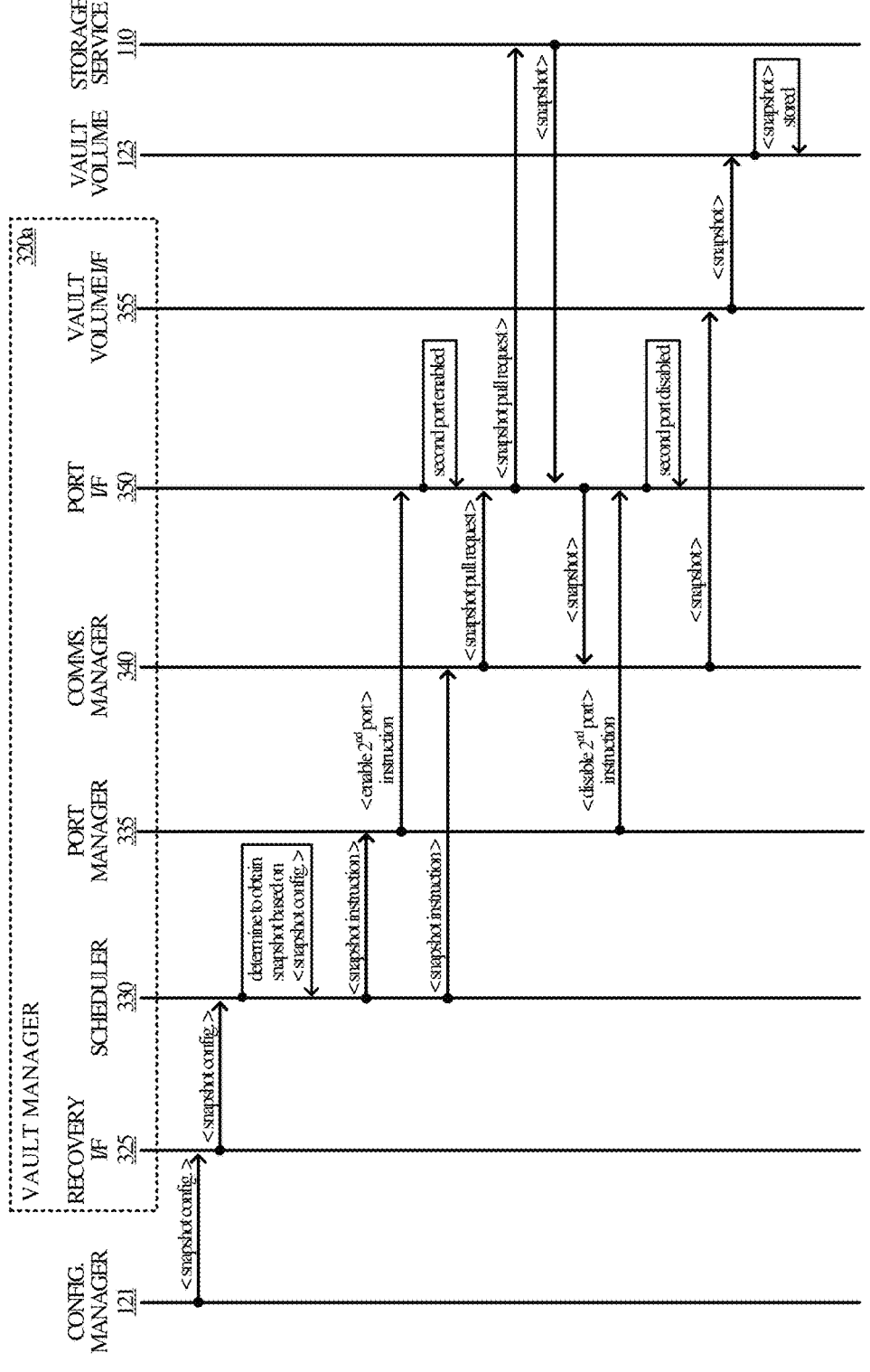
FIG. 4 illustrates an operational scenario in accordance with an implementation.

FIG. 4 illustrates operational scenario 400 in accordance with an implementation. Operational scenario 400 can be considered with respect to the elements of FIG. 1, the elements of FIG. 3, and the method steps of FIG. 2.

To begin, configuration manager 121 submits snapshot configuration data to scheduler 330 via configuration interface 325. Scheduler 330 determines, based on the snapshot configuration data, to obtain a snapshot of storage service 110. Scheduler 330 generates a snapshot instruction and submits the snapshot instruction to both port manager 335 and communications manager 340.

Port manager 335, in response to receiving the snapshot instruction, generates an instruction for enabling the second port (the port by which the snapshot pull request is communicated to storage service 110). The instruction to enable the second port is sent by port manager 335 to port interface 350. In response to the instruction to enable the second port, port interface 350 enables the second port.

Communications manager 340 also receives a snapshot instruction from scheduler 330. In response, communications manager 340 generates a snapshot pull request. The snapshot pull request is transmitted to storage service 110 via the enabled second port at port interface 350. Storage service 110 receives the snapshot pull request, produces a snapshot of data associated with storage service 110, and returns the snapshot to communications manager 340 via port interface 350. Upon reception of the snapshot at communications manager 340, port manager 335 sends an instruction to port interface 350 to disable the second port. Communications manager 340 then transmits the snapshot to vault volume 123 via vault volume interface 355. Vault volume 123 then stores the snapshot.

Figure 5:
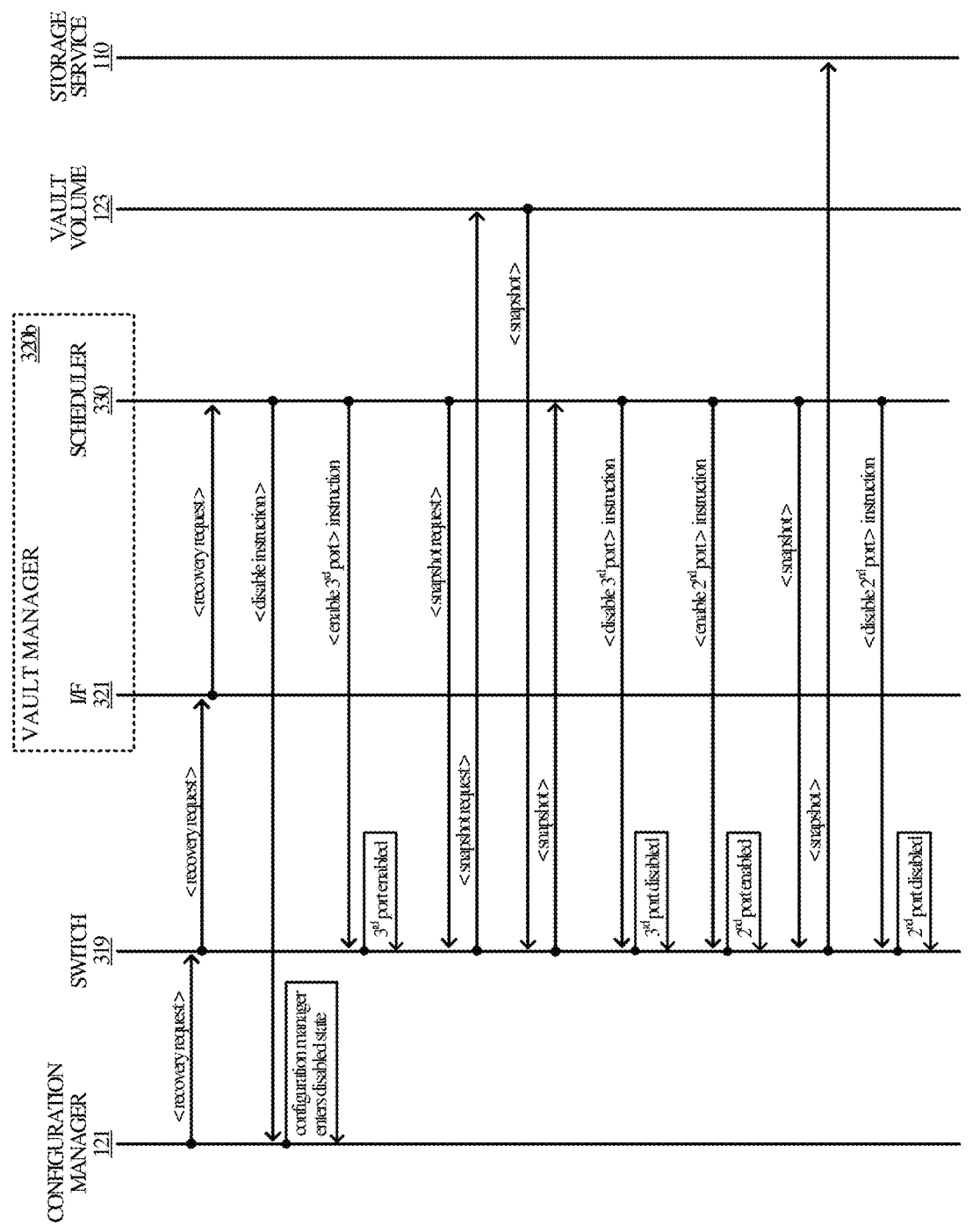
FIG. 5 illustrates another operational scenario in accordance with an implementation.

FIG. 5 illustrates another operational scenario, hereinafter referenced as scenario 500, in accordance with an implementation. Scenario 500 can be considered with respect to the elements of FIG. 3B. Where scenario 500 begins, a snapshot has already been stored in vault volume 123. The existing snapshot facilitates a recovery process of the data vault system.

To begin, configuration manager 121 generates a recovery request and sends the recovery request to scheduler 330 of vault manager 320*b* via interface 321. In response to receiving the recovery request, scheduler 330 generates a disable instruction, which is transmitted back to configuration manager 121 via interface 321 and switch 319. Scheduler 330*b* then generates instructions directing switch 319 to enable a third port of switch 319 by which the snapshot corresponding to the snapshot recovery request can be retrieved. Switch 319 enables the third port, a snapshot request is sent to vault volume 123, and the snapshot is returned. Scheduler 330*b* receives the snapshot via the third port of switch 319. With the snapshot acquired, scheduler 330*b* generates a disable instruction and transmits the disable instruction to switch 319. In response, switch 319 disables the third port.

To facilitate the recovery request by leveraging the recently retrieved snapshot, scheduler 330*b* generates an enabling instruction for a second port of switch 319, and transmits the instruction to switch 319. Switch 319 enables the second port, allowing scheduler 330*b* to transmit the snapshot corresponding to the recovery request to storage service 110. Scheduler 330*b* then generates a disabling instruction for the second port and transmits the disabling instruction to switch 319.

FIG. 6 illustrates computing device 605, which is representative of any system or collection of systems in which the various applications, processes, services, and scenarios disclosed herein may be implemented. Examples of computing apparatus illustrated by computing device 605 include, but are not limited to server computers, web servers, cloud computing platforms, and data center equipment, as well as any other type of physical or virtual server machine, container, and any variation or combination thereof. (In some examples, computing device 605 may also be representative of desktop and laptop computers, tablet computers, and the like.)

Computing device 605 may be implemented as a single apparatus, system, or device or may be implemented in a distributed manner as multiple apparatuses, systems, or devices. Computing device 605 includes, but is not limited to, processing system 625, storage system 610, software 615, communication interface system 620, and user interface system 630. Processing system 625 is operatively coupled with storage system 610, communication interface system 620, and user interface system 630.

Processing system 625 loads and executes software 615 from storage system 610. Software 615 includes and implements vault system processes 635, which is representative of the processes discussed with respect to the preceding Figures, an example of which is given in particular by method 200 of FIG. 2. When executed by processing system 625, software 615 directs processing system 625 to operate as described herein for at least the various processes, operational scenarios, and sequences discussed in the foregoing implementations. Computing device 605 may optionally include additional devices, features, or functionality not discussed for purposes of brevity.

Referring still to FIG. 6, processing system 625 may include a micro-processor and other circuitry that retrieves and executes software 615 from storage system 610. Processing system 625 may be implemented within a single processing device but may also be distributed across multiple processing devices or sub-systems that cooperate in executing program instructions. Examples of processing system 625 include general purpose central processing units, microcontroller units, graphical processing units, application specific processors, integrated circuits, application specific integrated circuits, and logic devices, as well as any other type of processing device, combinations, or variations thereof.

Storage system 610 may comprise any computer readable storage media readable by processing system 625 and capable of storing software 615. Storage system 610 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 610 may be implemented as a single storage device but may also be implemented across multiple storage devices or sub-systems co-located or distributed relative to each other. Storage system 610 may comprise additional elements, such as a controller, capable of communicating with processing system 625 or possibly other systems.

Software 615 (including vault system processes 635) may be implemented in program instructions and among other functions may, when executed by processing system 625, direct processing system 625 to operate as described with respect to the various operational scenarios, sequences, and processes illustrated herein. For example, software 615 may include program instructions for implementing data vault system processes and procedures as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 615 may include additional processes, programs, or components, such as operating system software, virtualization software, or other application software. Software 615 may also comprise firmware or some other form of machine-readable processing instructions executable by processing system 625.

In general, software 615, when loaded into processing system 625 and executed, transforms a suitable apparatus, system, or device (of which computing device 605 is representative) overall from a general-purpose computing system into a special-purpose computing system customized to support data vaulting process as described herein. Indeed, encoding software 615 on storage system 610 may transform the physical structure of storage system 610. The specific transformation of the physical structure may depend on various factors in different implementations of this description. Examples of such factors may include, but are not limited to, the technology used to implement the storage media of storage system 610 and whether the computer-storage media are characterized as primary or secondary storage, as well as other factors.

For example, if the computer readable storage media are implemented as semiconductor-based memory, software 615 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 620 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 605 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a data vault system, comprising:
 receiving, by a configuration manager via a first port located on a switch in the data vault system, a snapshot recovery request corresponding to a data storage service;
 determining, based on the snapshot recovery request, to provide a snapshot to the data storage service to facilitate a snapshot recovery process;

in response to determining to provide the snapshot, enabling a second port on the switch;
 retrieving the snapshot from a storage volume of the data vault system;
 transmitting, via the second port, the snapshot to provide the snapshot to the data storage service; and
 disabling the second port after transmitting the snapshot.

2. The method of claim 1, the method further comprising:
 hosting the data vault system on an isolated network remote to the data storage service.

3. The method of claim 2, the method further comprising:
 hosting the configuration manager on the isolated network.

4. The method of claim 3, the method further comprising:
 generating, in response to receiving the snapshot recovery request, a disable instruction; and
 transmitting the disable instruction to the configuration manager via the first port, wherein in response to receiving the disable instruction, the configuration manager enters a disabled state.

5. The method of claim 4, wherein the snapshot recovery request comprises a request for a snapshot of data contained within the data storage service.

6. The method of claim 5, wherein determining to provide the snapshot comprises:
 identifying, based on the snapshot recovery request, the snapshot, wherein the snapshot corresponds to content of the data storage service.

7. The method of claim 6, wherein retrieving the snapshot comprises:
 enabling a third port through which to retrieve the snapshot;
 acquiring the snapshot from the storage volume via the third port; and
 disabling the third port.

8. A computing device, comprising:
 one or more computer readable storage media;
 one or more processors operatively coupled with the one or more computer readable storage media; and
 a data vault system comprising program instructions stored on the one or more computer readable storage media, wherein the program instructions, when executed by the one or more processors, direct the computing device to at least:
  receive, by a configuration manager via a first port located on a switch in the data vault system, a snapshot recovery request corresponding to a data storage service,
  determine, based on the snapshot recovery request, to provide a snapshot to the data storage service to facilitate a snapshot recovery process,
  in response to determining to provide the snapshot, enabling a second port on the switch;
  retrieve the snapshot from a storage volume of the data vault system,
  transmit, via the second port, the snapshot to provide the snapshot to the data storage service, and
  disable the second port on the switch after transmitting the snapshot.

9. The computing device of claim 8, wherein the program instructions further direct the computing device to: host the data vault system on an isolated network remote to the data storage service.

10. The computing device of claim 9, wherein the program instructions further direct the computing device to: host the configuration manager on the isolated network.

11. The computing device of claim 10, wherein the program instructions further direct the computing device to:

generate, after the snapshot recovery request is received, a disable instruction; and transmit the disable instruction to the configuration manager via the first port, wherein in response to receiving the disable instruction, the configuration manager enters a disabled state.

12. The computing device of claim 11, wherein the snapshot recovery request comprises a request for a snapshot of data contained within the data storage service.

13. The computing device of claim 12, wherein the program instructions further direct the computing device to:

identify, based on the snapshot recovery request, the snapshot, wherein the snapshot corresponds to content of the data storage service.

14. The computing device of claim 13, wherein the program instructions further direct the computing device to:

enable a third port through which to retrieve the snapshot;

acquire the snapshot from the storage volume via the third port; and disable the third port.

15. One or more computer readable storage media having program instructions stored thereon that, when executed by one or more processors in a computing device, direct the computing device to at least:

receive, by a configuration manager of a data vault system via a first port located on a switch in the data vault system, a snapshot recovery request corresponding to a data storage service;

determine, based on the snapshot recovery request, to provide a snapshot to the data storage service to facilitate a snapshot recovery process;

in response to determining to provide the snapshot, enabling a second port on the switch;

retrieve the snapshot from a storage volume of the data vault system;

transmit, via the second port, the snapshot to provide the snapshot to the data storage service; and disable the second port on the switch after transmitting the snapshot.

16. The one or more computer readable storage media of claim 15, wherein the program instructions further direct the computing device to:

host the data vault on an isolated network remote to the data storage service.

17. The one or more computer readable storage media of claim 16, wherein the program instructions further direct the computing device to:

host the configuration manager on the isolated network.

18. The one or more computer readable storage media of claim 17, wherein the program instructions further direct the computing device to:

generate, after the snapshot recovery request is received, a disable instruction; and transmit the disable instruction to the configuration manager via the first port, wherein in response to receiving the disable instruction, the configuration manager enters a disabled state.

19. The one or more computer readable storage media of claim 18, wherein the snapshot recovery request comprises a request for a snapshot of data contained within the data storage service.

20. The one or more computer readable storage media of claim 19, wherein the program instructions further direct the computing device to:

identify, based on the snapshot recovery request, the snapshot, wherein the snapshot corresponds to content of the data storage service.

* * * * *